(12) United States Patent
Doerr et al.

(10) Patent No.: US 7,042,629 B2
(45) Date of Patent: May 9, 2006

(54) LINEAR OPTICAL SAMPLING METHOD AND APPARATUS

(75) Inventors: Christopher Richard Doerr, Middletown, NJ (US); Christophe J. Dorrer, Matawan, NJ (US); Peter J. Winzer, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 150 days.

(21) Appl. No.: 10/782,003

(22) Filed: Feb. 19, 2004

(65) Prior Publication Data

US 2005/0185255 A1 Aug. 25, 2005

(51) Int. Cl.
G02F 2/00 (2006.01)
G02F 1/01 (2006.01)
H04B 10/06 (2006.01)

(52) U.S. Cl. .................. 359/325; 359/246; 398/205; 398/207

(58) Field of Classification Search ........ 359/325–326, 359/245–246, 250, 259; 398/204, 205, 207
See application file for complete search history.

(56) References Cited

U.S. PATENT DOCUMENTS 6,564,160 B1 * 5/2003 Jungerman et al. ......... 702/106
6,654,153 B1 * 11/2003 Kaneko ....................... 359/248
6,756,775 B1 * 6/2004 Jungerman .................. 324/121 R

OTHER PUBLICATIONS

C. Dorrer et al, "Linear Optical Sampling," published in IEEE Photonics Tech. Letters, vol. 15, No. 12, Dec. 2003, pp. 1746-1748.

* cited by examiner

Primary Examiner—John D. Lee

(57) ABSTRACT

A linear optical sampling apparatus, temporally samples a modulated optical signal using the amplitude of the interference of its electric field with the electric field of a laser pulse. The apparatus includes a 90° optical hybrid that combines the optical signal and laser pulse in order to generate two quadratures interference samples $S_A$ and $S_B$. A processor compensates for optical and electrical signal handling imperfections in the hybrid, balanced detectors, and A/D converters used in the optical sampling apparatus. The processor numerically scales the two quadratures interference samples $S_A$ and $S_B$ over a large collection of samples by imposing that the average $<S_A>=<S_B>=0$ and $<S_A^2>=<S_B^2>$ and then minimizes $2<S_A \cdot S_B>/(<S_A^2>+<S_B^2>) = \cos(\phi_B - \phi_A)$. This is done by adjusting the phase between the two quadratures (ideally either $-\pi/2$ or $+\pi/2$) so that $\cos(\phi_B - \phi_A)$ is zero. The processor then generates a demodulated sample signal using the quadratures interference samples $S_A$ and $S_B$. According to one feature, the hybrid sets the relative phase between two quadratures of their interferometric component so that the phase sensitivity inherent to linear optics is removed. A variety of hybrid arrangements is disclosed that can be implemented using integrated waveguide technology. The apparatus enables sampling of picosecond pulses up to 640 Gb/s with high sensitivity and temporal resolution.

15 Claims, 6 Drawing Sheets

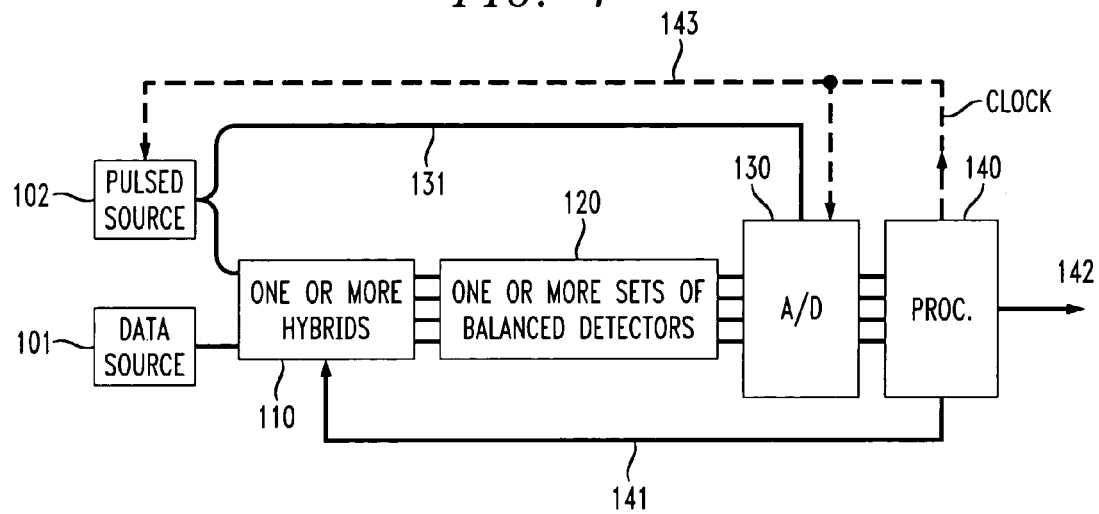
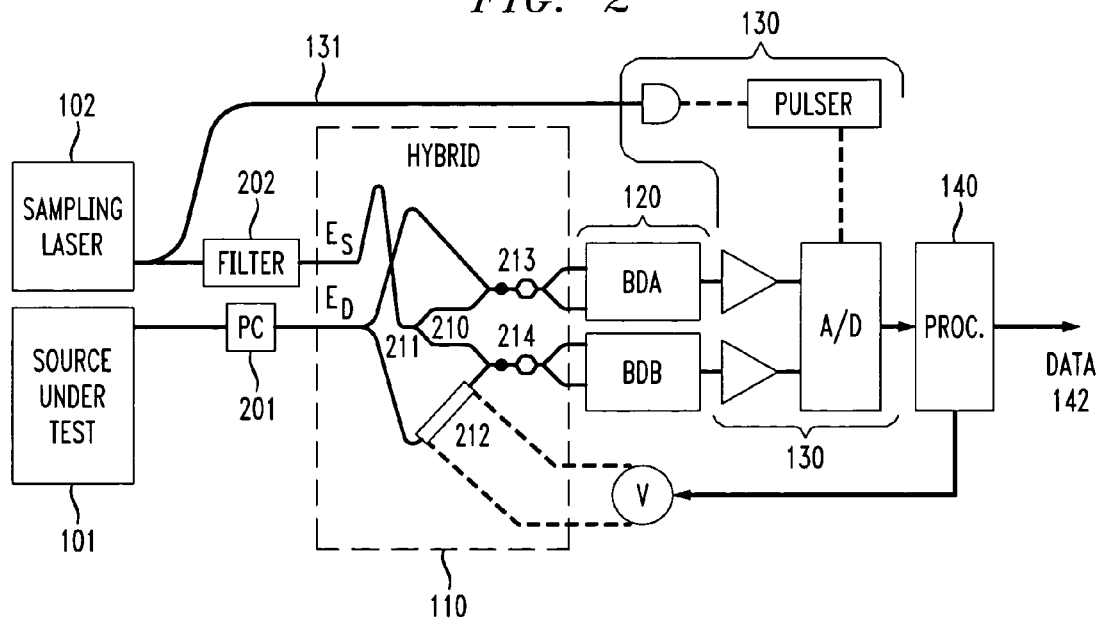

LINEAR OPTICAL SAMPLING METHOD AND APPARATUS

TECHNICAL FIELD OF THE INVENTION

This invention relates generally to linear optical sampling and, more particularly, to a linear optical sampling apparatus including a 90° optical hybrid and a sample scaling processor.

BACKGROUND OF THE INVENTION

The temporal characterization of high bit-rate sources is crucial for the development of high-speed optical telecommunications. As direct photodetection and electronic sampling do not have the required bandwidth, such characterization must be performed by taking advantage of the large bandwidth of optical sources. A nonlinear interaction with an ancillary pulse, such as sum-frequency generation, four-wave mixing, cross-phase modulation or two-photon absorption, can be used to provide a temporal gating mechanism with a resolution on the order of the duration of the ancillary pulse [1–5]. (Note, the bracketed references [ ] refer to publications listed in the attached Reference list.) Because sub-picosecond sampling pulses are available, such an approach can lead to a detection bandwidth on the order of 500 GHz. However, it often lacks sensitivity. For example, sampling of eye diagrams at 640 Gb/s was achieved with a sensitivity equal to $1.3 \times 10^8$ mW$^2$, stated as the product of the peak power of the sampling source and the peak power of the data source [5].

Linear optical sampling, where the electric field of the waveform under test is gated by the electric field of a sampling pulse, can demonstrate temporal resolutions identical to nonlinear techniques with a large gain in sensitivity. Using a free-space setup, sampling up to 80 Gb/s with sensitivity equal to 80 mW$^2$ was demonstrated [6].

Notwithstanding the demonstrated free-space linear optical sampling arrangement, there is a continuing need to implement a more practical linear optical sampling apparatus with improved performance.

SUMMARY OF THE INVENTION

In accordance with the present invention, we describe a linear optical sampling apparatus, which temporally characterizes a data modulated optical signal using the amplitude of the interference of its electric field with the electric field of a short laser pulse. The apparatus includes a 90° optical hybrid that produces the interference and generates two quadratures interference samples $S_A$ and $S_B$ formed as a result of the interference. A processor compensates for optical and electrical signal handling imperfections in the hybrid, balanced detectors, and A/D converters used in the optical sampling apparatus. The processor numerically scales the two quadratures interference samples $S_A$ and $S_B$ over a large collection of samples by imposing that the average $<S_A>=<S_B>=0$ and $<S_A^2>=<S_B^2>$ and then minimizes $2<S_A \cdot S_B>/(<S_A^2>+<S_B^2>)=\cos(\phi_B-\phi_A)$. This is done by adjusting the phase between the two quadratures (ideally either $-\pi/2$ or $+\pi/2$) so that $\cos(\phi_B-\phi_A)$ is zero. The processor then generates a demodulated sample data pulse signal using the quadratures interference samples $S_A$ and $S_B$.

According to one feature, the hybrid combines the two sources and sets the relative phase between two quadratures of their interferometric component so that the phase sensitivity inherent to linear optics is removed. In a preferred embodiment, the hybrid is implemented using integrated silica waveguide technology. Sampling of picosecond pulses and eye diagrams up to 640 Gb/s with high sensitivity and temporal resolution is demonstrated. Optimal time resolution and low distortion are obtained by proper choice of the spectral characteristics of the sampling pulse.

More specifically, our invention is a linear optical signal sampler apparatus for measuring temporal samples of a data modulated optical signal (MOS) 101, the linear optical signal sampler apparatus comprising a pulsed optical signal (POS) 102 having the same polarization as the MOS and operable at a pulse rate equal to a fraction of the data modulation rate of the MOS;

a 90° hybrid having a first input for receiving the MOS and a second input for receiving the POS, the hybrid combining the MOS and POS to produce temporal quadrature samples $S_A$ and $S_B$ of the interference of the electrical fields of the MOS with the POS, the optical signals producing the $S_A$ quadrature samples being outputted at a first and second outputs, and the optical signals producing the $S_B$ quadrature samples being outputted at a third and fourth outputs;

two balanced photodetectors (BDA,BDB) 120, 121 operable at the pulse rate of the POS, coupled to the first, second, third, and fourth outputs for detecting and generating analog electrical signal representations of the $S_A$ and $S_B$ quadrature samples;

a sampling analog/digital (A/D) converter apparatus 130 for sampling and generating digital representations of the real and imaginary components of the $S_A$ and $S_B$ quadratures samples, the sampling A/D detector apparatus being synchronized to the pulses of the POS; and a processor for compensating for optical and electrical signal handling imperfections in the hybrid, balanced detectors, and A/D converters and for measuring temporal signal samples using quadratures samples $S_A$ and $S_B$ and then generating a demodulated sampled data pulse from the quadratures samples $S_A$ and $S_B$.

According to another feature of our invention, we describe a method of operating an optical signal sampler apparatus for measuring temporal samples of a data modulated optical signal (MOS) 101, comprising the steps of:

(1) receiving a data-modulated optical signal (MOS);

(2) receiving a pulsed optical signal (POS) at a pulse rate equal to a fraction of the data modulation rate of the MOS;

(3) producing a $S_A$ and a $S_B$ quadratures samples of the interference of the electrical fields of the MOS with the POS;

(4) detecting and generating digital representations of the $S_A$ and $S_B$ quadratures samples;

(5) compensating for signal handling imperfections in the apparatus used to perform steps (3) and (4);

(6) measuring temporal signal samples by generating a demodulated sampled pulse from the quadratures samples $S_A$ and $S_B$.

Another aspect of our invention is directed to an optical receiver for demodulating the data from a data modulated optical signal source (MOS) 101 received over an optical facility, the optical receiver comprising a pulsed optical signal source (POS) 102, having the same polarization as the MOS, operable at a pulse rate equal to the data modulation rate of the MOS;

a 90° hybrid having a first input for receiving the MOS and a second input for receiving the POS, the hybrid combining the MOS and POS to produce quadratures samples $S_A$ and $S_B$ of the interference of the electrical fields of the MOS with the POS, the signals producing the $S_A$ quadrature samples being outputted at a first and second outputs, and the optical signals producing the $S_B$ quadrature samples being outputted at a third and fourth outputs;

a first balanced photodetector (BDA) 120, operable at the data modulation rate of the MOS, coupled to the first and second outputs for detecting and generating analog electrical signal representations of the $S_A$ quadrature samples;

a second balanced detector BDB 121, operable at the data modulation rate of the MOS, coupled to the third and fourth outputs for detecting and generating analog electrical signal representations of the $S_B$ quadrature samples;

a sampling analog/digital (A/D) converter apparatus 130 for sampling and generating digital representations of the $S_A$ and $S_B$ quadratures samples, the sampling A/D detector apparatus being synchronized to the pulses of the POS; and a processor apparatus for processing the two quadratures samples $S_A$ and $S_B$ and for generating therefrom a demodulated sample data output.

Other features describe a variety of hybrid arrangements for use in the optical signal sampler apparatus.

BRIEF DESCRIPTION OF THE DRAWINGS

The present invention will be more fully appreciated by consideration of the following Detailed Description, which should be read in light of the accompanying drawing in which:

FIG. 1 illustrates a generalized block diagram of our linear optical signal sampler apparatus.

FIG. 2 illustrates, in accordance with the present invention, a preferred embodiment of the hybrid shown in FIG. 1.

In the following description, identical element designations in different figures represent identical elements. Additionally in the element designations, the first digit refers to the figure in which that element is first located (e.g., 101 is first located in FIG. 1).

DETAILED DESCRIPTION

1. Linear Optical Sampling

Figure 3:
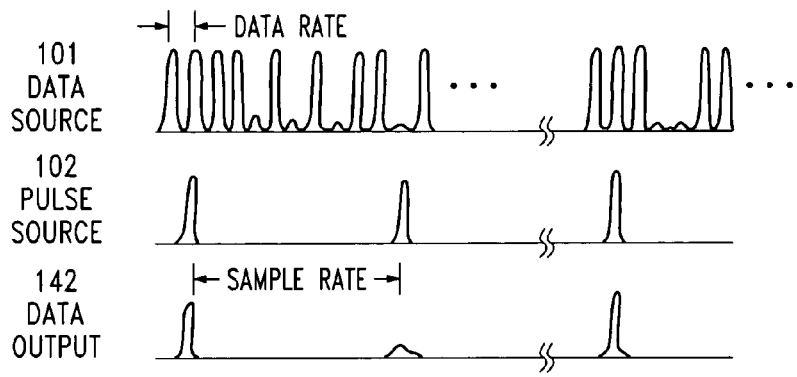
FIG. 3 shows illustrative signals of the data source, pulse source, and data output for the linear optical signal sampler apparatus.

The following paragraphs summarize the linear optical sampling apparatus described in reference [6] which is incorporated by reference herein. Linear optical sampling temporally characterizes an optical waveform by measuring the amplitude of the interference of its electric field $E_D(t)$ with the electric field of a sampling pulse $E_S(t)$ using two orthogonal quadratures of the interference. A quadrature $S_A=\text{real}[\exp(i\phi_A)\cdot\int E_D(t)\cdot E_S^*(t)dt]$ can be obtained by combining the two sources optically and performing time-integrated balanced detection on the two outputs of the coupler using low-speed detectors (the temporal integration extends in theory only over the integration time of the detectors, but such time is in practice much longer than the durations of the various pulses, and integration will always be taken from $-\infty$ to $+\infty$ for the sake of simplicity). The constant phase $\phi_A$ describes the optical phase difference between the two fields, and makes the value of a single quadrature highly dependent upon the delay between the two sources. Such dependence is removed by simultaneously measuring an orthogonal quadrature $S_B=\text{real}[\exp(i\phi_B)\cdot\int E_D(t)E_S^*(t)dt]$, with $\phi_B-\phi_A=\pm\pi/2$. The two quadratures can be squared and summed to give $|\int E_D(t)\cdot E_S^*(t)dt|^2$. In practice, the sampling pulse scans through the waveform to be characterized because of the offset in the rate of the two sources, so that the acquired samples are $$S(\tau)=|\int E_D(t)\cdot E_S^*(t-\tau)dt|^2 \qquad (1)$$

This convolution can be written in the frequency domain as:

$$S(\tau)=|\int E_D(\omega)\cdot E_S^*(\omega)\cdot\exp(i\omega\tau)d\omega|^2 \qquad (2)$$

For a sampling pulse with constant spectral density and phase over the spectral support of the waveform under test, Eq. 2 leads to $S(\tau)=|E_D(\tau)|^2$, i.e. the temporal intensity of the waveform is measured without any blurring due to limited time resolution.

With reference to FIG. 1, in accordance with the present invention, we have recognized that a processor 140 can be used for compensating for optical and electrical signal handling imperfections in the hybrid (such as unequal splitting and combining ratios of the optical sources), balanced detectors (such as unequal gains of the detectors and electrical amplifiers), and A/D converters (such as unequal gains of the electronic circuits or imperfect synchronization of the circuits) used in the optical sampling apparatus to compensate for non-optimal implementation. The processor 140 does this by making numerical scaling adjustments in the temporal quadrature samples $S_A$ and $S_B$. Since the data source 101, pulse optical source 102 are not correlated, the two quadratures should have an average value equal to zero and identical variances. Numerically scaling the two measured quadratures on a large collection of samples by imposing $<S_A>=<S_B>=0$ and $<S_A^2>=<S_B^2>$ allows compensation of non-perfect balanced detection. It can also be shown that $2<S_A\cdot S_B>/(<S_A^2>+<S_B^2>)$ is equal to $\cos(\phi_B-\phi_A)$. Therefore, the phase (141) between the two quadratures (ideally either $-\pi/2$ or $+\pi/2$) must be set in order to cancel such quantity. As will be discussed in detail in later paragraphs, the processor 140 of our linear optical signal sampler apparatus numerically scales the two quadratures interference samples $S_A$ and $S_B$ over a large collection of samples by imposing $<S_A>=<S_B>=0$ and $<S_A^2>=<S_B^2>$ and then minimizes $2<S_A\cdot S_B>/(<S_A^2>+<S_B^2>)=\cos(\phi_B-\phi_A)$. This is done by adjusting the phase between the two quadratures (ideally either $-\pi/2$ or $+\pi/2$) so that $\cos(\phi_B-\phi_A)$ is zero. The processor 140 then generates a demodulated sample data pulse signal using the quadratures interference samples $S_A$ and $S_B$, for example, by calculating the sum $S_A^2+S_B^2$.

2. Improved Linear Optical Signal Sampler Apparatus

The following description jointly references FIG. 1 and FIG. 3. FIG. 1 illustrates a generalized block diagram of our linear optical signal sampler apparatus. FIG. 3 shows illustrative signals of data source 101, pulse optical source 102, and demodulated sample data pulse signal 142. As shown in FIG. 1, the data source (or source under test) 101 connects to a first input port of a 90° optical hybrid 110. The signal from data source 101 is typically a data modulated optical carrier signal—shown by 101 in FIG. 3. A pulse optical source 102 (typically a sampling or pulsed laser signal—shown by 102 of FIG. 3) connects to a second input port of 90° optical hybrid 110. The data source 101 and pulse optical source 102 have the same polarization. The optical hybrid 110 may be implemented using one hybrid (see FIGS. 2, 6, 9, and 10) or using two hybrids (see FIGS. 7 and 8). Depending on the configuration, either two balanced detectors (e.g., BDA, BDB of FIG. 2) or four balanced detectors (e.g., BDA, BDB and BDC, BDD of FIG. 7) are used in balance detector unit 120. The A/D unit 130 is selected to be compatible with balanced detector unit 120, so as to be able to process the outputs from the one or two set of balanced detectors.

In hybrid 110, the short laser pulse of pulse optical source 102 temporally characterizes the data modulated optical signal of data source 101 using the amplitude of the interference of its electric field with the electric field of the short laser pulse. The spectral characteristics of the pulse optical source 102 is selected to spectrally overlap pulses of data source 101 to provide optimal time resolution and low distortion in the demodulated sample data pulse signal 142.

A portion of the pulse optical source 102 is also coupled, via coupler 103, to provide a trigger signal to synchronize the operation of analog to digital (A/D) circuit 130. In an alternate arrangement (shown in dotted-lines in FIG. 1), a clock signal 143 (for example, in the RF domain) from the processor 140 is used to set the sampling rate of sampling laser 102 and the sampling rate of A/D circuit 130.

The 90° optical hybrid 110 produces the interference of the data source 101 electric field with the electric field of pulsed laser signal 102 resulting in the generation of two quadratures interference samples $S_A$ and $S_B$. The two quadratures interference samples $S_A$ and $S_B$ are measured with two balanced photodetectors (BDA and BDB) 121 and 122, whose outputs are sampled by the two ports of an A/D board. The simultaneous acquisition of the two quadratures $S_A$ and $S_B$ is synchronized to the pulsed laser signal 102.

In accordance with the present invention, the processor 140 compensates for signal processing imperfections in the hybrid unit 110, balanced detector unit 120, and A/D converters 130 and measures temporal signal samples using quadratures samples $S_A$ and $S_B$. The processor 140 then generates a demodulated sampled data pulse from the quadratures samples $S_A$ and $S_B$ (for example by generating a demodulated sampled data pulse having a power equal to the sum $S_A^2 + S_B^2$). The processor compensates for the signal processing imperfections by numerically scaling quadratures samples $S_A$ and $S_B$ over a large collection of samples by imposing that the average $<S_A> = <S_B> = 0$ and $<S_A^2> = <S_B^2>$. The processor compensates for the signal processing imperfections by controlling the relative phase between quadratures samples $S_A$ and $S_B$ and by ensuring that $2<S_A \cdot S_B>/(<S_A^2>+<S_B^2>)$ is equal to zero by adjusting the phase of quadratures samples $S_A$ and $S_B$ in the hybrid or by numerical processing of quadratures samples $S_A$ and $S_B$.

More specifically, processor 140 performs adjustment of the mean and standard deviation of the two quadratures $S_A$ and $S_B$, and the squaring and summing to generate the demodulated sample data pulse signal 142 (shown by 142 in FIG. 3). The processor 140 performs these adjustments by controlling the phase between the two quadratures $S_A$ and $S_B$ using phase control signal 141.

Figure 4:
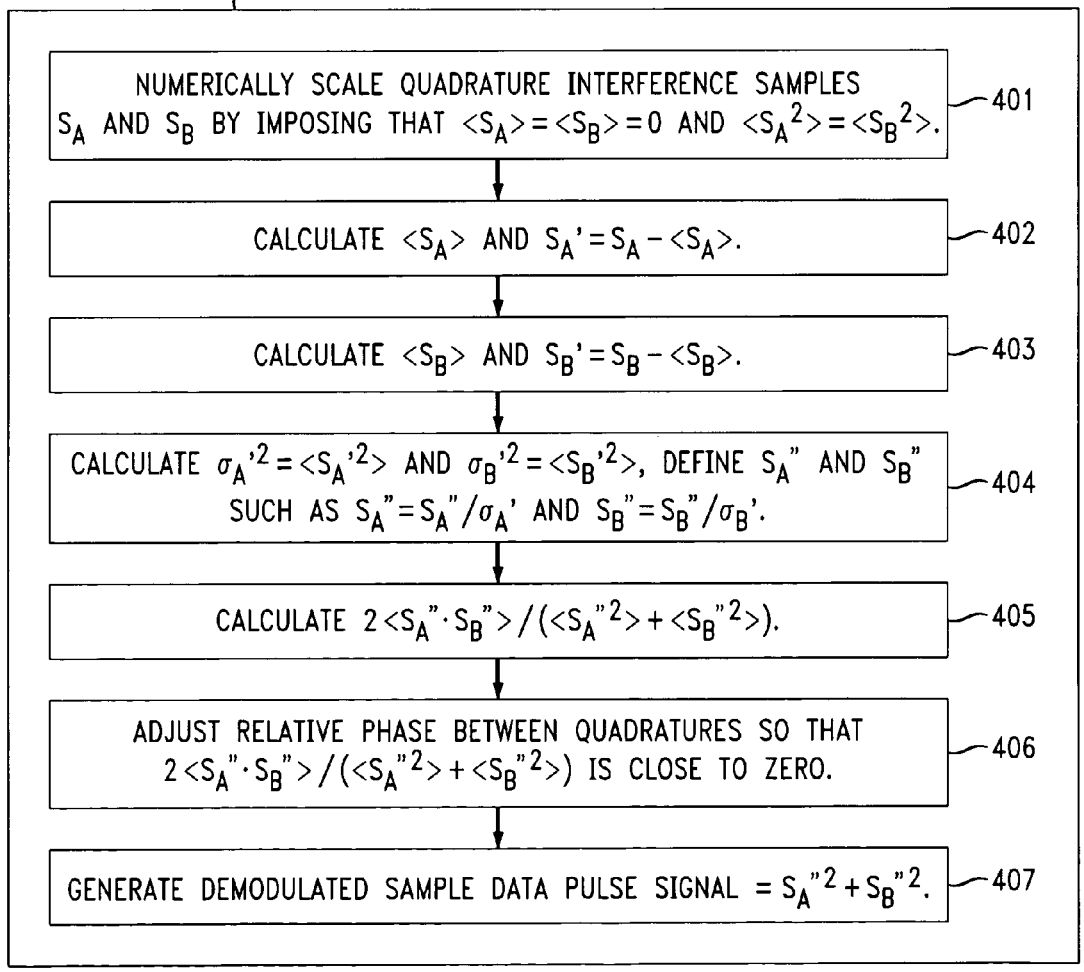
FIG. 4 illustrates, in accordance with the present invention, the preferred operating functions performed by the processor.

The operations performed by the processor 140 are shown illustratively in FIG. 4. As shown in FIG. 4, processor 140.

A. Numerically scales the two quadratures interference samples $S_A$ and $S_B$ over a large collection of samples by imposing that $<S_A> = <S_B> = 0$ and $<S_A^2> = <S_B^2>$, where the brackets represent the average value calculated over a large number of samples. This can be achieved by:
  a. Calculating $<S_A>$, then calculating $S_A' = S_A - <S_A>$ and using it for all subsequent operations.
  b. Calculating $<S_B>$, then calculating $S_B' = S_B - <S_B>$ and using it for all subsequent operations.
  c. Calculating $\sigma_A'^2 = <S_A'^2>$, then calculating $\sigma_B'^2 = <S_B'^2>$, then defining $S_A''$ and $S_B''$ such as $S_A'' = S_A'/\sigma_A'$ and $S_B'' = S_B'/\sigma_B'$. Note that other scalings techniques can be performed (what matters in the end is that the standard variation calculated on the two quadratures are identical).

B. Calculates the quantity $2<S_A'' \cdot S_B''>/(<S_A''^2>+<S_B''^2>)$, which is equal to the cosine of the relative phase between the two quadratures [i.e., $\cos(\phi_B - \phi_A)$]. As the relative phase should be equal to either $+\pi/2$ or $-\pi/2$ for optimal operation, its cosine should be equal to 0.

C. Adjusts the relative phase between the two quadratures so that the calculated $2<S_A'' \cdot S_B''>/(<S_A''^2>+<S_B''^2>)$ is close to zero, within experimental uncertainty. With the hybrid, this operation is performed by the processor 140 adjusting, via phase adjust control signal 141, the voltage applied to the phase-shifter (212 of FIG. 2).

D. The processor then generates a demodulated sample data pulse signal 142 equal to the sum $S_A''^2 + S_B''^2$.

Using our linear optical signal sampler apparatus of FIG. 1, including the novel processor 140 functions, enable the demodulation of 1.2 ps (pico second) data pulses that have been data-modulated at up to the 640 Gb/s (301 of FIG. 3) using a 1.2 ps pulsed laser signal (302 of FIG. 3) that has the same polarization as the modulated data signal. The output of our linear optical signal sampler apparatus (142 of FIG. 3) is a demodulated sampled 640 Gb/s data signal, or eye diagram signal, which is achieved with about a $10^3$ improvement in sensitivity and with almost no distortion. The processor 140 may be implemented using one or more technologies including hardware, firmware, and software that are arranged to perform the above described operations.

3. Preferred Linear Optical Sampler

With reference to FIG. 2, we describe a preferred implementation of linear optical sampling apparatus based on an integrated optical hybrid, with a large gain in practicality compared to the free-space setup previously demonstrated [6]. As can be seen on FIG. 2, the hybrid 110 accepts the fields of the sampling laser 102 and source under test 101 (whose polarizations have been made identical using a polarization controller PC 201) as two inputs and provides two pairs of combined fields (two quadratures $S_A$ and $S_B$) as four outputs. The hybrid structure is made of silica waveguides on a silicon substrate. It will be appreciated by those skilled in the art that other planar lightwave structures, such as InP waveguides, could be built to produce essentially the same function. While for clarity the layout of the hybrid on FIG. 2 was stretched vertically, the actual physical size of the structure is about 1.6 cm (from top to bottom) by 4.0 cm (from left to right). The two interference couplers 213 and 214, shown illustratively as 2-by-2 three-section couplers, provide 3 dB coupling with low wavelength, polarization and fabrication sensitivity [7]. The phase difference between the two quadratures $S_A$ and $S_B$ is set using a thermo-optic phase shifter 212 in one section of the hybrid 110; a voltage V, illustratively 3 volts, corresponds approximately to a phase shift of one radian. The precise control (using phase adjust 141) of the relative phase results in polarization and wavelength insensitivity making our hybrid desirable compared to previously realized hybrids [8–9].

Further simplification of the arrangement of FIG. 2 is possible by monolithic integration of the balanced detectors 120 with the hybrid 110 [10]. Illustratively, a 10 MHz passively mode-locked fiber laser is used as the sampling laser 102. As detailed below, the laser (which has a bandwidth of the order of 40 nm) is filtered 202 in order to match the spectral support of the data source under test 101, since only the energy of the sampling laser pulse 102 spectrally overlapping with the source under test 101 contributes to the signal. The two quadratures $S_A$ and $S_B$ are measured, illustratively, using two 700-MHz balanced photodetectors (BDA and BDB) whose outputs are sampled by the two ports of an A/D unit 130. The simultaneous acquisition of the two quadratures $S_A$ and $S_B$ is synchronized to the sampling pulses using a low-speed photodiode and pulser 131. As noted previously, processor 140 uses phase adjust signal 141 to perform scaling adjustments of the mean and standard deviation of the two quadratures $S_A$ and $S_B$. Processor 140 then performs the squaring and summing to generate the demodulated sample data pulse signal 142.

Illustrative tests on the linear optical sampling apparatus of FIG. 2, produced a connector-to-connector input-to-output losses measured using a non-polarized source range from 9.5 dB to 10.1 dB, including 6 dB corresponding to the power splitting (by 3-dB couplers 210, 211). The polarization dependence of the input-to-output transmission was measured as 0.6 dB. The ability of the optical hybrid 110 to precisely set the phase between the two quadratures is demonstrated when sampling a 10 GHz 33% return-to-zero waveform (without data encoding).

Figure 5A:
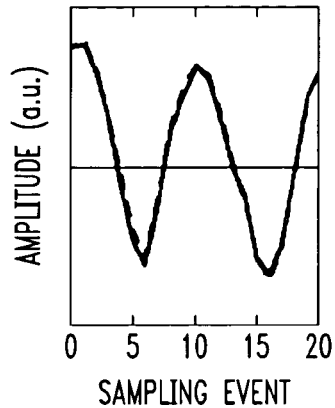
FIGS. 5(A), 5(B), and 5(C) illustrate the outputs of balanced detectors BDA and BDB around the peak of the waveform measured for values of the relative phase $\phi_B-\phi_A$ equal to 0, $\pm\pi/2$ and $\pi$.
Figure 5B:
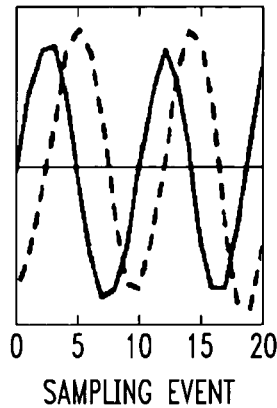
Figure 5C:
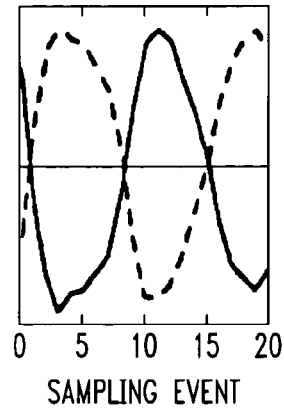

A detail of the two signals measured by the balanced detectors BDA and BDB (continuous and dashed line, respectively) around the peak of the waveform measured for values of the relative phase $\phi_B-\phi_A$ equal to 0, $\pm\pi/2$ and $\pi$ is plotted, respectively, as (A), (B), and (C) on FIG. 5 [where the vertical axis is measured in arbitrary units (a.u.), and the horizontal axis corresponds to sampling events].

4. Alternative Linear Optical Samplers

Figure 6:
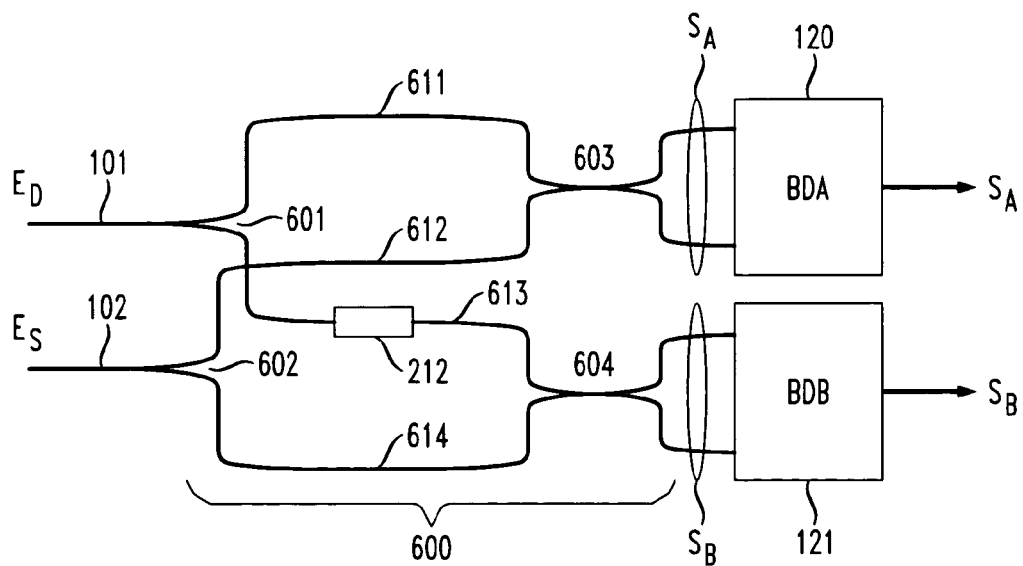
FIGS. 6–10 illustrate, in accordance with the present invention, alternate arrangements of linear optical samplers.

For ease of comparison between the linear optical samplers of FIGS. 6–10, the 90° optical hybrid 110 of FIG. 1 has been redrawn as shown in FIG. 6, with the positions of the data source 101 (source under test) and sampling laser (pulsed source) 102 reversed. Waveguide structures, 1:2 couplers (3-dB) 601, 602, are used to split the data source ($E_D$) 101 and sampling source ($E_S$) 102, respectively, and interference couplers 603 and 604 are used to recombine the sources and set the relative phase between the two quadratures. The elements 601–604 essentially form a hybrid 600 similar to hybrid 110 of FIG. 2. The two sources $E_D$ and $E_S$ are copolarized. The phase difference between the two quadratures $S_A$ and $S_B$ is set using a thermo-optic phase shifter 212. Note that while thermo-optic phase shifter 212 has been shown in path 613, it could also have been placed in any of the other paths 611, 612, and 614.

The two quadratures $S_A$ and $S_B$ are measured with two balanced detectors BDA and BDB, respectively. The processor 140 then operates on the quadrature pair ($S_A$, $S_B$). Such an implementation can only sample the portion of the source under test $E_D$ that is copolarized with the sampling laser $E_S$. However, in real applications, the polarization of the source under test $E_D$ is unknown and can vary significantly and rapidly. Therefore we must characterize the source under test $E_D$ at a given time along its two polarizations, which can be referred to as polarization diversity. The total intensity of the source under test $E_D$ (as would be measured by a conventional photodetector if such a detector with suitable bandwidth is available) is the sum of the intensities of each polarization. Polarizers and half-wave plate can be built using waveguide technology. For example, a polarizer can be implemented using a Mach-Zehnder interferometer with a birefringent element in one of its arms. A half-wave plate can be implemented using a birefringent element integrated to the waveguide.

Figure 7:
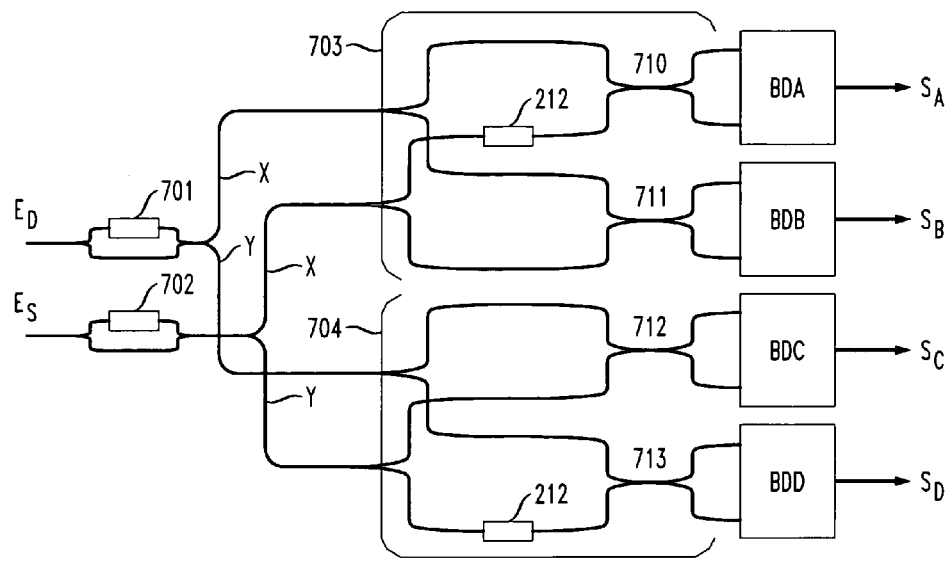

In FIG. 7, the source under test $E_D$ is split by a polarizer 701, the sampling pulse $E_S$ is split with a polarizer 702, and two pair of hybrids 710, 711 and 712, 713 are used to sample each of the polarizations of the source under test with a copolarized sampling pulse. Note that while the thermo-optic phase shifter 212 is shown in FIG. 7 as located in a particular path of each hybrid 703 and 704, it may alternatively be located in any of the other paths in the same manner as discussed previously for FIG. 6. Similarly in FIGS. 8–10 the thermo-optic phase shifter 212 can be located in any of the paths.

Returning to FIG. 7, the two quadratures for one polarization "x" of the source under test are measured with BDA and BDB, while the two quadratures for the other polarization "y" are measured with BDC and BDD. The processor 140 then operates independently, as described previously, on the quadrature pairs ($S_A$, $S_B$) and ($S_C$,$S_D$) to generate the demodulated sample data signal 142.

Figure 8:
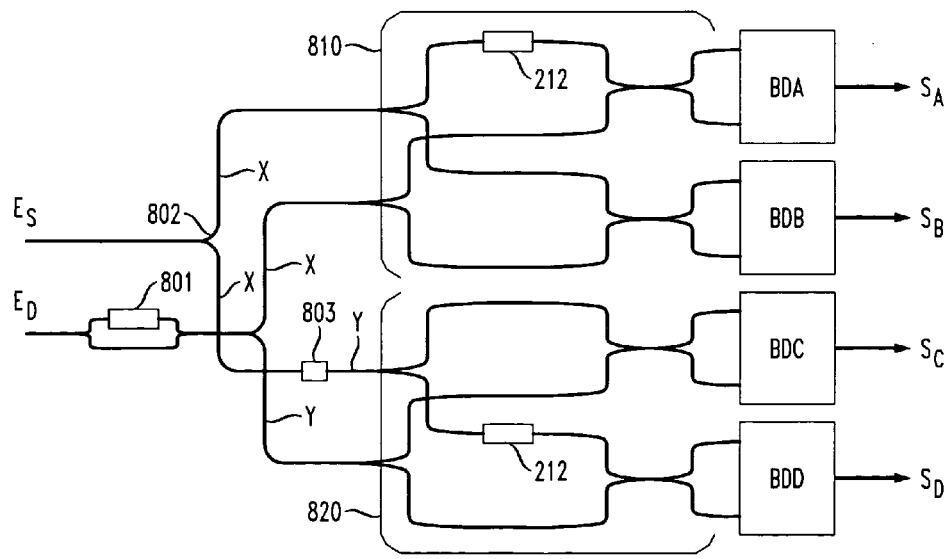

In FIG. 8, the source under test $E_D$ is split by a polarizer 801 into its polarization x and y. The sampling pulse $E_S$ linearly polarized along x is split with a 3-dB coupler (splitter) 802, therefore generating two sampling pulses with polarization x. The x polarization of the source under test $E_D$ goes to the first hybrid 810, and is sampled by the sampling pulse $E_S$. The y polarization of the source under test $E_D$ goes to the second hybrid coupler 820. The polarization of the sampling pulse is rotated by a half-wave plate 803 and becomes y, and the subsequent sampling pulse is sent to the second hybrid coupler 820. The x polarization of the source under test $E_D$ is therefore obtained from the balanced detectors BDA and BDB, while the y polarization of the source under test is obtained from the balanced detectors BDC and BDD. Note that one could also choose to rotate the polarization of the source under test $E_D$ in the second interference coupler 820, instead of rotating the polarization of the sampling pulse $E_S$. The processor 140 then operates independently, as described previously, on the pair ($S_A$, $S_B$) and on the pair ($S_C$,$S_D$).

Figure 9:
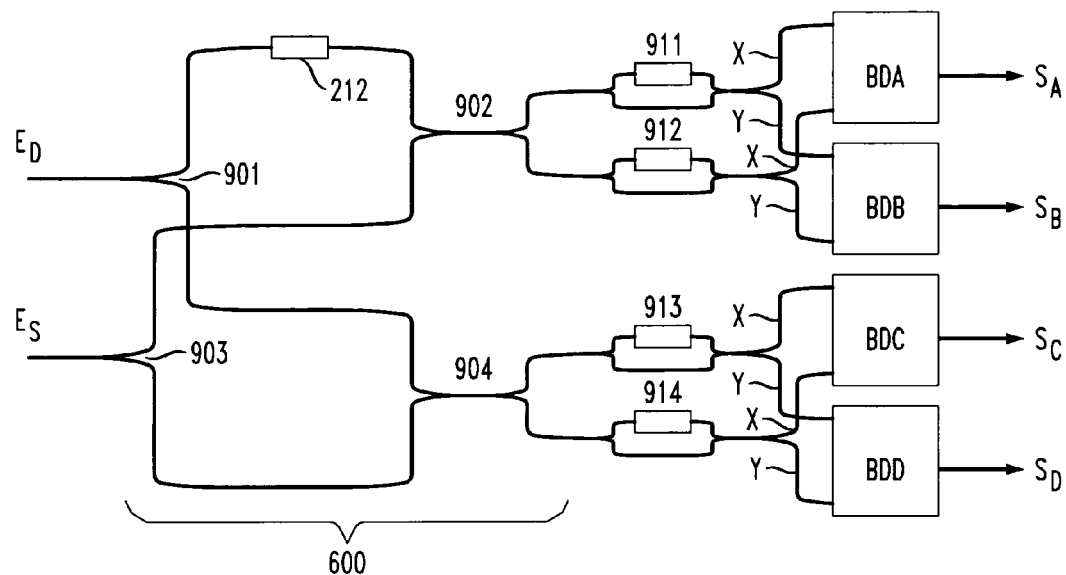

In FIG. 9, a sampling pulse $E_S$ with energy along the two polarizations x and y is sent into a single hybrid 600 with the source under test $E_D$ of unknown state of polarization. At the 4 outputs of hybrid 600, polarizers 911–914 are set in order to split the recombined fields into linear polarizations along x and y. In this embodiment, the x polarization of the source under test is obtained from the 2 balanced detectors BDA and BDC, while the y polarization is obtained from the 2 balanced detectors BDB and BDD. Again as described previously, processor 140 operates independently on the pair ($S_A$, $S_C$) and on the pair ($S_B$,$S_D$).

Figure 10:
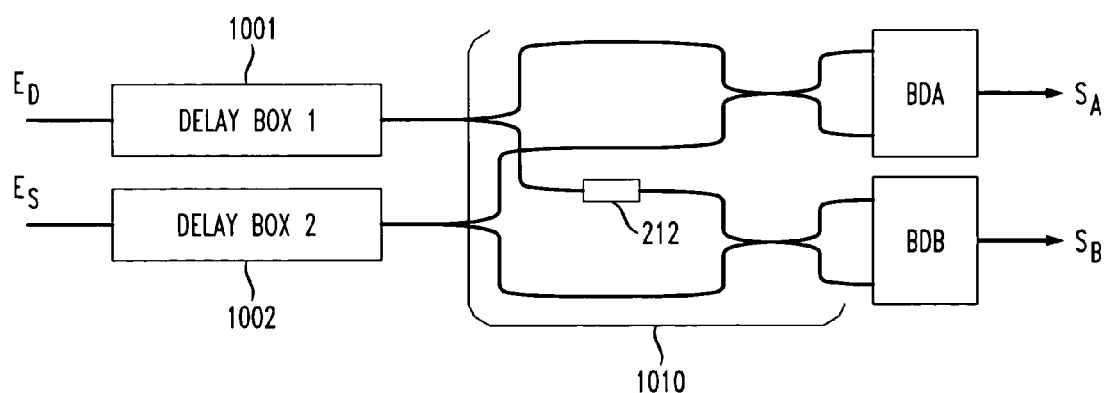

In FIG. 10, the source under test $E_D$ is sent into a delay box 1001 that splits it into its two orthogonal polarizations x and y, and introduces a relative delay T between them. The sampling pulse is sent to an identical delay box 1002, which generates two sampling pulses polarized along x and y, with a relative delay T. The two sources are sent into a single interference coupler 1010. The signals that are measured by the two balanced detectors BDA, BDB for the first and second sampling pulses generated by the delay box 1002 correspond to the quadratures of the interference of the source under test along its two polarizations $S_{Ax}$, $S_{Bx}$ and $S_{Ay}, S_{By}$. The processor then operates independently, as described previously, on the pair ($S_{Ax}$, $S_{Bx}$) and on the pair ($S_{Ay}, S_{By}$).

5. Optical Receiver

Figure 11:
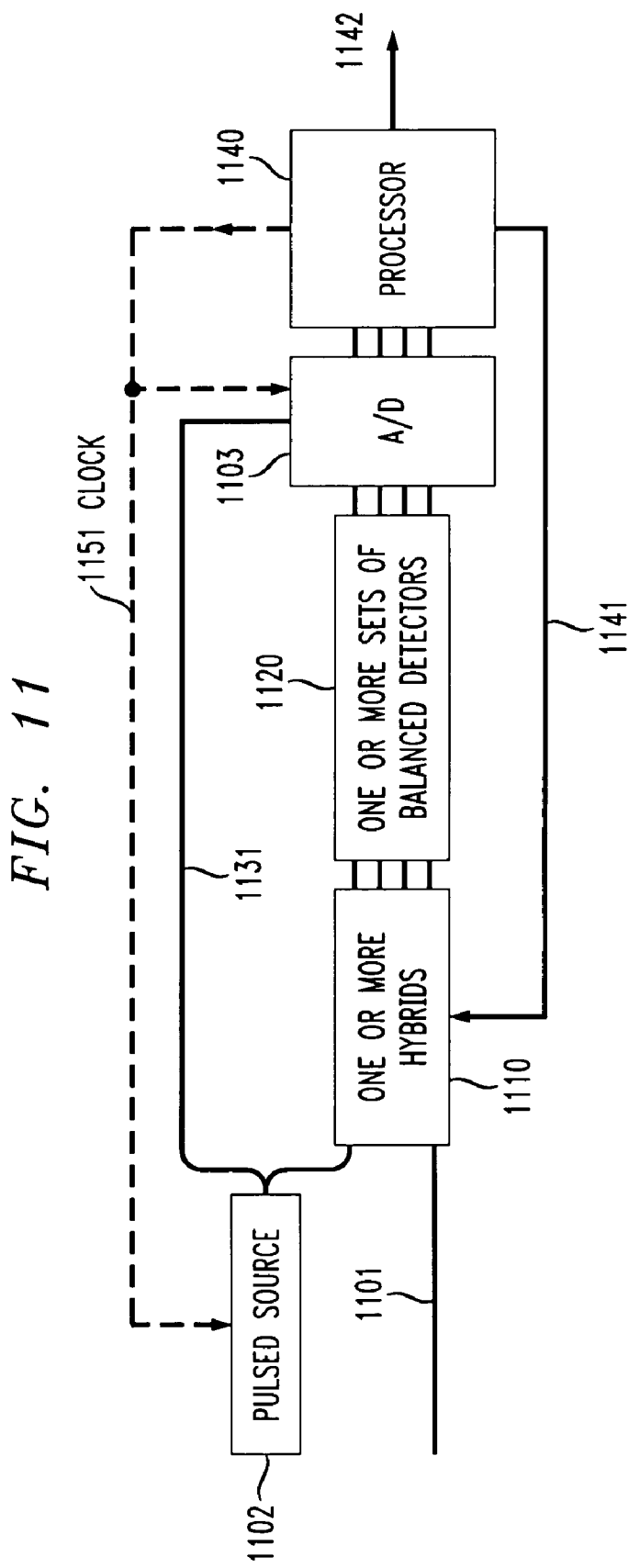
FIG. 11 illustrates an implementation of our invention as an optical receiver.

Shown in FIG. 11 is an implementation of our invention as an optical receiver for demodulating a data modulated optical signal (MOS) 1101 received over an optical facility. As shown MOS 1101 is coupled to a first input port of a 90° optical hybrid 110. A pulse optical source 1102 (pulsed laser signal) having the same data (or pulse) rate and polarization as MOSS. 1101, connects to a second input port of 90° optical hybrid 1110. As previously discussed with reference to FIG. 1, the optical hybrid 1110 may be implemented using one hybrid (see FIGS. 2, 6, 9, and 10) or using two hybrids (see FIGS. 7 and 8). Depending on the configuration, two balanced detectors (e.g., BDA, BDB of FIG. 2) or four balanced detectors (e.g., BDA, BDB and BDC, BDD of FIG. 7) are used in balance detector unit 1120. The A/D unit 1130 is selected to be compatible with balanced detector unit 1120, so as to be able to process the outputs from the one or two set of balanced detectors. For convenience, the receiver of FIG. 11 is assumed to use one hybrid in hybrid unit 1110, one set of balanced detectors in balanced detector unit 1120, and an compatible A/D unit 1130.

A portion of the pulse optical source 1102 is coupled, via coupler 103, to provide a trigger signal to synchronize the operation of analog/digital (A/D) circuit 1103. In an alternate arrangement (shown in dotted-lines in FIG. 11), a clock signal 1151 (for example, in the RF domain) from the processor 1140 is used to set the sampling rate of pulsed source 1102 and the sampling rate of A/D circuit 1130.

The 90° optical hybrid 1110 produces an interference of the electric field of MOS 1101 with the electric field of pulsed laser signal 1102 resulting in the generation of two quadratures interference samples $S_A$ and $S_B$. The two quadratures interference samples $S_A$ and $S_B$ are measured with two high speed balanced photodetectors (BDA and BDB) 1102, which operate at the data rate of MOS 1101. Illustratively, the two high speed balanced photodetectors 1102 may be implemented using silicon or InGaAs. The outputs of BDA and BDB, 1102, are sampled by the two ports of an A/D board 1103. The A/D circuit 1103 is arranged to operate at the data rate of MOS 1001, so as to be able to generate digital samples of the quadratures interference samples $S_A$ and $S_B$. Illustratively, the A/D circuit 1103 may contain sample-and-hold circuits that are commonly used in telecommunication systems. In the same manner as discussed with reference to FIG. 1, the processor 1104 is arranged to calculate a demodulated sample data signal 1105 having an power level equal to the sum $S_A^2 + S_B^2$. Since the pulse optical source 1102, BDA and BDB, 1102, A/D board 1103, and processor 1104 all operate at input data modulated optical signal (MOS) 1101 rate, the demodulated output signal 1105 is at the data rate of MOS 1101. The data transmission rate of the receiver of FIG. 11 is limited by the bandwidth of the two high speed balanced photodetectors (BDA and BDB) 1102.

Various modifications of our invention will occur to those skilled in the art. Nevertheless all deviations from the specific teachings of this specification that basically rely upon the principles and their equivalents through which the art has been advanced are properly considered within the scope of the invention as described and claimed.

REFERENCES

[1] J. Li, J. Hansryd, P. O. Hedekvist, P. A. Andrekson, and S. N. Knudsen, "300-Gb/s eye-diagram measurement by optical sampling using fiber-based parametric amplification," IEEE Photon. Technol. Lett., vol. 13, pp. 987–989, 2001.

[2] H. Ohta, N. Banjo, N. Yamada, S. Nogiwa and Y. Yanagisawa, "Measuring eye diagram of 320 Gb/s optical signal by optical sampling using passively modelocked fibre laser," Electron. Lett., vol. 37, pp. 1541–1542, 2001.

[3] I. Kang and K. F. Dreyer, "Sensitive 320 Gbit/s eye diagram measurements via optical sampling with semiconductor optical amplifier-ultrafast nonlinear interferometer," Electron. Lett., vol. 39, pp. 1081–1083, 2003.

[4] J. Li, M. Westlund, H. Sunnerud, B-E. Olsson, M. Karlsson, and P. A. Andrekson, "0.5 Tbit/s eye-diagram measurement by optical sampling using XPM-induced wavelength shifting in highly nonlinear fiber," Mo 4.6.4, European Conference on Optical Communication, 2003.

[5] N. Yamada, S. Nogiwa, and H. Ohta, "Measuring eye diagram of 640-Gbit/s OTDM signal with optical sampling system by using wavelength-tunable soliton pulse," Mo 4.6.5, European Conference on Optical Communication, 2003.

[6] C. Dorrer, D.C. Kilper, H.R. Stuart, G. Raybon and M. G. Raymer, "Linear optical sampling," IEEE Photon. Technol. Lett., vol. 15, pp. 1746–1748, 2003.

[7] C. R. Doerr, L. W. Stulz, D. S. Levy, R. Pafchek, M. Cappuzzo, L. Gomez, A. Wong-Foy, E. Chen, E. Laskowski, G. Bogert, and G. Richards, "Potentially low-startup-cost wavelength add-drop node using silica waveguide integration," to appear in J. Lightwave Technol.

[8] E. C. M. Pennings, R. J. Deri, R. Bhat, T. R. Hayes and N.C. Andreakis, <<Ultracompact, all-passive optical 90°-hybrid on InP using self-imaging,>> IEEE Photon. Technol. Lett., vol. 5, pp. 701–703, 1993.

[9] S. Norimatsu, N. Takachio, Y. Inoue, M. Hosoya, H. Tsunetsugu, and S. Hata, <<An optical 90°-hybrid balanced receiver module using a planar lightwave circuit,>> IEEE Photon. Technol. Lett., vol. 6, pp. 737–740, 1994.

[10] R. J. Deri, E. C. M. Pennings, A. Scherer, A. S. Gozdz, C. Caneau, N. C. Andreadakis, V. Shah, L. Curtis, R. J. Hawkins, J. B. D. Soole, and J.-I. Song, "Ultracompact monolithic integration of balanced, polarization diversity photodetectors for coherent lightwave receivers," IEEE Photon. Technol. Lett., vol. 4, pp. 1238–1240, 1992.

We claim:

1. A linear optical signal sampler apparatus for measuring temporal samples of a modulated optical signal (MOS), the linear optical signal sampler apparatus comprising a pulsed optical signal (POS) having energy in the same polarization as the MOS and operable at a pulse rate equal to a fraction of the modulation rate of the MOS;

a hybrid having a first input for receiving the MOS and a second input for receiving the POS, the hybrid combining the MOS and POS to produce temporal quadrature samples $S_A$ and $S_B$ of the intefference of the electrical fields of the MOS with the POS, the optical signals corresponding to the $S_A$ quadrature samples being outputted at a first and second outputs, and the optical signals corresponding to the $S_B$ quadrature samples being outputted at a third and fourth outputs;

a balanced photodetector apparatus (BDA,BDB) coupled to the first, second, third, and fourth outputs for detecting and generating analog electrical signal representations of the $S_A$ and $S_B$ quadrature samples;

a sampling analog to digital (A/D) converter apparatus for sampling and generating digital representations of $S_A$ and $S_B$ quadratures samples, the sampling A/D converter apparatus being synchronized to the pulses of the POS; and a processor for compensating for optical and electrical signal handling imperfections in the hybrid, balanced detectors, and A/D converters and for measuring temporal signal samples by generating a demodulated sampled data pulse from the quadratures samples $S_A$ and $S_B$.

2. The optical signal sampler apparatus of claim 1 wherein the processor compensates for signal handling imperfections in the generation and detection of the two quadratures by numerically scaling quadratures samples $S_A$ and $S_B$ over a large collection of samples by imposing that the average $<S_A> = <S_B> = 0$ and $<S_A^2> = <S_B^2>$ and generating a demodulated sampled data pulse having a power equal to the sum $S_A^2 + S_B^2$.

3. The optical signal sampler apparatus of claim 1 wherein the processor controls the relative phase between quadratures samples $S_A$ and $S_B$ by ensuring that $2<S_A \cdot S_B>/(<S_A^2> + <S_B^2>)$ is equal to zero by adjusting the phase between the quadrature samples $S_A$ and $S_B$ in the hybrid or by numerical processing of quadrature samples $S_A$ and $S_B$.

4. The optical signal sampler apparatus of claim 1 wherein the hybrid includes
a phase adjuster operable in response to a control signal from the processor for adjusting the relative phase between the $S_A$ and a $S_B$ quadratures.

5. The optical signal sampler apparatus of claim 1 wherein the hybrid includes
a first interference coupler for receiving the MOS and POS signals and for producing the $S_A$ quadratures samples and
a second interference coupler for receiving the MOS and POS signals and for producing the $S_B$ quadratures samples.

6. The optical signal sampler apparatus of claim 1 being implemented using an arrangement of waveguides to minimize any differences in the $S_A$ and $S_B$ quadratures samples caused by any environmental factor.

7. The optical signal sampler apparatus of claim 1 wherein the hybrid includes
a first 1×2 coupler for receiving the MOS and for producing first and second MOS components;
a second 1×2 coupler for receiving pulses of POS and for producing first and second POS components;
a phase shifter for introducing a predetermined phase shift delay in the second POS component;
a first 2×2 interference coupler for receiving the first MOS component and the first POS component and for producing the $S_A$ quadrature samples;
a second 2×2 interference coupler for receiving the second MOS component and the second POS component and for producing the $S_B$ quadrature samples.

8. The optical signal sampler apparatus of claim 1 wherein the processor apparatus includes means to
(A) numerically scale the two quadratures interference samples $S_A$ and $S_B$ over a large collection of samples by imposing that $<S_A> = <S_B> = 0$ and $<S_A'^2 = <S_B'^2>$, where the brackets represent the average value calculated over a large number of samples;
(B) calculate $<S_A>$, then calculate $S_A' = S_A - <S_A>$ and use it for all subsequent operations;
(C) calculate $<S_B>$, then calculate $S_B' = S_B - <S_B>$ and use it for all subsequent operations;
(D) calculate $\sigma_A'2 = <S_A'^2>$, then calculate $\sigma_B'2 = <S_B'^2>$, then define $S_A''$ and $S_B''$ such as $S_A'' = S_A'/\sigma_A'$ and $S_B'' = S_B'/\sigma_B'$;

(E) calculate the quantity $2<S_A'' \cdot S_B''>/(<S_A''^2> = <S_B''^2>)$, which is equal to the cosine of the relative phase between the two quadratures, which since the relative phase is equal to either $\sigma/2$ or $-\sigma/2$ should equal zero;
(F) adjust the relative phase between the two quadratures so that the calculated $2<S_A'' \cdot S_B''>/(<S_A''^2> + <S_B''^2>)$ is close to zero; and
(G) generate, for each sample, a demodulated sampled data pulse signal having a power equal to the sum $S_A''^2 + S_B''^2$.

9. A linear optical signal sampler apparatus for measuring temporal samples of a modulated optical signal source (MOS), the linear optical signal sampler apparatus comprising a pulsed optical signal source (POS) having energy in the same polarization as the MOS and operable at a pulse rate equal to a fraction of the data modulation rate of the MOS; a 90° hybrid implemented using an arrangement of waveguides and including a first input for receiving the MOS and a second input for receiving the POS, the hybrid further including a first interference coupler for generating interference of the electrical fields of the MOS with the POS to produce $S_A$ quadrature samples, the optical signals producing the $S_A$ quadrature samples being outputted at first and second outputs of the hybrid, and a second interference coupler for generating interference of the electrical fields of the MOS with the POS to produce $S_B$ quadrature samples, the MOS phase being adjusted so that the relative phase between the Se quadrature samples and the $S_A$ quadrature samples is $\pi/2$, the optical signals producing the $S_B$ quadrature samples being outputted at third and fourth outputs of the hybrid;

a first balanced photodetector (BDA), operable at the pulse rate of the POS, coupled to the first and second outputs for detecting and generating analog electrical signal representations of the $S_A$ quadrature samples;

a second balanced photodetector (BDB), operable at the pulse rate of the POS, coupled to the third and fourth outputs for detecting and generating analog electrical signal representations of the $S_B$ quadrature samples;

a sampling analog/digital (A/D) converter apparatus for sampling and generating digital representations of the $S_A$ and $S_B$ quadratures samples, the sampling A/D converter apparatus being synchronized to the pulses of the POS; and a processor apparatus for measuring temporal signal samples using two quadratures samples $S_A$ and $S_B$ and for generating therefrom the demodulated pulse.

10. The optical signal sampler apparatus of claim 9 wherein the hybrid includes
a polarizer for splitting the MOS ($E_D$) into an x and y polarizations;
a polarizer for splitting the POS ($E_P$) into an x and y polarizations;
a first hybrid for sampling the x polarization of the MOS and POS to form the $S_A$ and $S_B$ quadrature samples of the x polarization;
a second hybrid for sampling the y polarization of the MOS and POS to form the $S_A$ and $S_B$ quadrature samples of the y polarization; and wherein the balanced photodetector apparatus includes
a first pair of balanced photodetectors (BDA,BDB) for detecting and generating analog electrical signal representations of the $S_A$ and $S_B$ quadrature samples of the x polarization; and a second pair of balanced photodetectors (BDC,BDD) for detecting and generating analog electrical signal representations of the $S_A$ and $S_B$ quadrature samples of the y polarization.

11. The optical signal sampler apparatus of claim 9 wherein the hybrid includes
   a polarizer for splitting the MOS ($E_D$) into an x and y polarizations;
   a splitter for splitting an x polarized POS ($E_P$) into a first and second sampling POS pulses;
   a half-wave plate for rotating the second sampling POS pulse into a y polarization POS pulse;
   a first hybrid for sampling the x-polarized MOS and the x-polarized first sampling pulse to form the $S_A$ and $S_B$ quadrature samples of the x polarization;
   a second hybrid for sampling the y-polarized MOS and the y-polarized POS pulse to form the $S_A$ and $S_B$ quadrature samples of the y polarization; and wherein the balanced photodetector apparatus includes
   a first pair of balanced photodetectors (BDA,BDB) for detecting and generating analog electrical signal representations of the $S_A$ and $S_B$ quadrature samples of the x polarization; and
   a second pair of balanced photodetectors (BDC,BDD) for detecting and generating analog electrical signal representations of the the $S_A$ and $S_B$ quadrature samples of the y polarization.

12. The optical signal sampler apparatus of claim 9 wherein the hybrid includes
   a first hybrid unit including
      a 1×2 coupler for receiving the MOS polarized with energy in both polarizations and for producing first and second MOS components;
   a second 1×2 coupler for receiving pulses of POS and for producing first and second POS components;
   a first 2×2 interference coupler for receiving the first MOS component and the first POS component and for producing the $S_A$ quadrature samples;
   a second 2×2 interference coupler for receiving the second MOS component and the second POS component and for producing the $S_B$ quadrature samples;
   four polarizers for splitting the recombined fields from the first and second interference couplers into linear polarizations x and y;
   a first pair of balanced photodetectors (BDA,BDC) arranged for detecting and generating analog electrical signal representations of a $S_A$ quadrature sample and a $S_C$ quadrature sample, respectively, of the MOS of the x polarization;
   a second pair of balanced photodetectors (BDB,BDD) arranged for detecting and generating analog electrical signal representations of a $S_B$ quadrature sample and a $S_D$ quadrature sample, respectively, of the MOS of the y polarization; and wherein
   the processor operates independently on the $S_A$ and $S_C$ quadrature samples and the $S_B$ and $S_D$ quadrature samples.

13. An optical receiver for demodulating the data from a modulated optical signal source (MOS) received over an optical facility, the optical receiver comprising
   a pulsed optical signal source (POS), having energy in the same polarization as the MOS, operable at a pulse rate equal to the modulation rate of the MOS;
   a 90° hybrid having a first input for receiving the MOS and a second input for receiving the POS, the hybrid combining the MOS and POS to produce a $S_A$ and a $S_B$ quadratures samples of the interference of the electrical fields of the MOS with the POS, the signals corresponding to the $S_A$ quadrature samples being outputted at a first and second outputs, respectively, and the signals corresponding to the $S_B$ quadrature samples being outputted at a third and fourth outputs, respectively;
   a first balanced photodetector (BDA), operable at the data modulation rate of the MOS, coupled to the first and second outputs for detecting and generating analog electrical signal representations of the $S_A$ quadrature samples;
   a second balanced detector BDB, operable at the data modulation rate of the MOS, coupled to the third and fourth outputs for detecting and generating analog electrical signal representations of the $S_B$ quadrature samples;
   a sampling analog/digital (A/D) converter apparatus for sampling and generating digital representations of the $S_A$ and $S_B$ quadratures samples, the sampling A/D converter apparatus being synchronized to the pulses of the POS; and
   a processor apparatus for processing the two quadratures samples $S_A$ and $S_B$ and for generating therefrom a demodulated sample data output.

14. A method of operating an optical signal sampler apparatus for measuring temporal samples of a modulated optical signal (MOS), comprising the steps of:
   (1) receiving a data modulated optical signal (MOS);
   (2) receiving a pulsed optical signal (POS) at a pulse rate equal to a fraction of the modulation rate of the MOS;
   (3) producing a $S_A$ and a $S_B$ quadratures samples of the interference of the electrical fields of the MOS with the POS;
   (4) detecting and generating digital representations of the real and imaginary components of the $S_A$ and $S_B$ quadratures samples;
   (5) compensating for optical and electrical signal handling imperfections in the apparatus used to perform steps (3) and (4);
   (6) measuring temporal signal samples by generating a demodulated sampled pulse from the quadratures samples $S_A$ and $S_B$.

15. A method of claim 14 wherein the measuring step includes the steps of:
   (A) numerically scaling the two quadratures interference samples $S_A$ and $S_B$ over a large collection of samples by imposing that the average $<S_A>=<S_B>=0$ and average $<S_A^2>=<S_B^2>$, where the brackets represent the average value calculated over a large number of samples;
   (B) calculating $<S_A>$, then calculating $S_A'=S_A-<S_A>$ and using it for all subsequent operations;
   (C) calculating $<S_B>$, then calculating $S_B'=S_B-<S_B>$ and using it for all subsequent operations;
   (D) calculating $\sigma_A'^2=<S_A'^2>$, then calculating $\sigma_B'^2=<S_B'^2>$ then define $S_A''$ and $S_B''$ such as "$S_A''=S_A'/\sigma_A'$". and $S_B''=S_B'/\sigma_B'$;
   (E) calculating the quantity $2<S_A''\cdot S_B''>/(<S_A''^2>=<S_B''^2>)$, which is equal to the cosine of the relative phase between the two quadratures, which since the relative phase is equal to either $\pi/2$ or $-\pi/2$ should equal zero;
   (F) adjusting the relative phase between the two quadratures so that the calculated $2<S_A''\cdot S_B''>/(<S_A''^2>+<S_B''^2>)$ is close to zero; and
   (G) generating, for each sample, a demodulated sample data pulse signal equal to the sum $S_A''^2+S_B''^2$.

* * * * *